March 2, 1943.  F. M. M. B. SALOMON  2,313,024
DEVICE ADAPTED TO ELIMINATE OSCILLATIONS
Filed Dec. 7, 1938
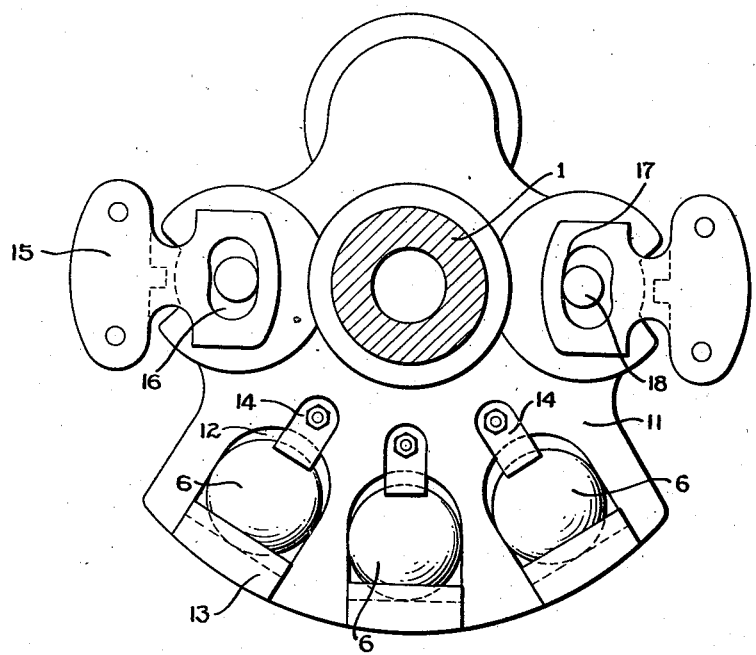
Fig 1
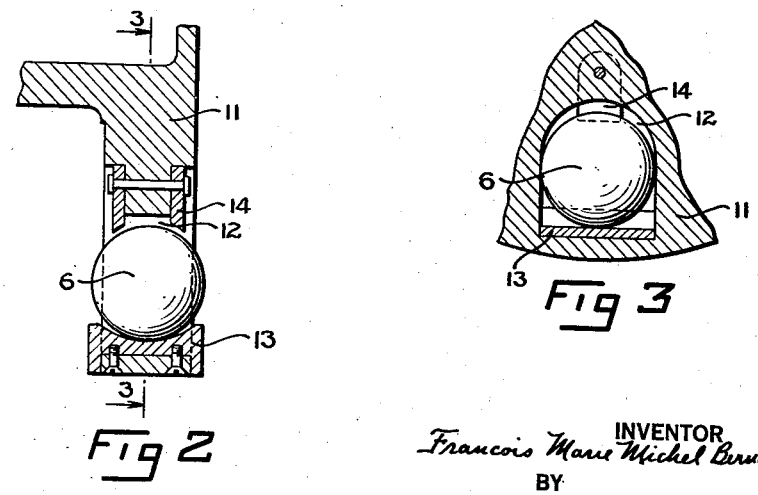
Fig 2
Fig 3
INVENTOR
Francois Marie Michel Bernard Salomon
BY
F. Bascom Smith
ATTORNEY Patented Mar. 2, 1943

2,313,024

UNITED STATES PATENT OFFICE 2,313,024

DEVICE ADAPTED TO ELIMINATE OSCILLATIONS

François Marie Michel Bernard Salomon, Paris, France; vested in the Alien Property Custodian Application December 7, 1938, Serial No. 244,382

11 Claims. (Cl. 74—604)

My invention has for its object devices adapted to eliminate or to reduce the vibrations in rotary machine parts submitted to disturbing, chiefly periodical, forces, and more particularly the flexional oscillations or transverse vibrations of shafts, said oscillations or vibrations appearing alone or together with other oscillations or vibrations of the shaft, such as torsional oscillations.

For reducing the torsional oscillations of a shaft, it is well known to provide on said shaft, or on a member keyed on it, auxiliary pendular masses which are submitted to the centrifugal forces produced by the rotation of the shaft and which rock in a plane perpendicular to the axis of said shaft under the action of the disturbing forces.

According to the essential feature of my invention, flexional-oscillations are reduced by using auxiliary pendular masses of the aforesaid kind, said masses being adapted to rock in such manner that their oscillating motion has a component parallel to the axis of the shaft. To this end, the auxiliary masses are adapted to rock in planes containing the axis of the shaft or parallel to it. I may also provide auxiliary masses which rock like so-called "spherical pendulums," i. e. pendulums oscillating in space.

The movements of the auxiliary masses thus compensate either flexional vibrations only or simultaneously flexional and torsional oscillations of the rotary machine part on which they are mounted.

According to a preferred embodiment of my invention, auxiliary solid masses are used, which are not submitted to elastic action, nor to frictional action, and which are moreover entirely free.

It is often of advantage for the movements of the auxiliary masses to be a rolling motion. In fact, the auxiliary masses themselves preferably form rolling parts rolling directly on races integral with the shaft generating the centrifugal forces. These races may have either a simple or a double curvature.

It is of interest for obtaining the greatest efficiency against periodical disturbing forces, to provide certain constructional conditions which are substantially equivalent for the auxiliary centrifugal masses to conditions of resonance with reference to the disturbing forces.

In other words, the system of auxiliary masses must, under the action of centrifugal forces, have natural periods such that at least one of them has a value at least approximatively equal to at least one of the periods of the disturbing forces.

The rolling surfaces of the auxiliary masses are advantageously surfaces of revolution and, in particular, cylindrical or spherical surfaces.

If the shaft generating the centrifugal forces carries races on which the auxiliary masses roll, these races are advantageously of cylindrical shape and may, for instance, be ring-shaped or else they may form spheres or portions of spheres.

For eliminating simultaneously disturbances of different pulsations, it is possible to make simultaneous use of different oscillating systems tuned each to a given pulsation; but in this case—and sometimes also in the case of a single disturbing pulsation—it is of advantage to use a system of masses forming two or several stages and thus having a greater number of degrees of liberty, like a double, treble, quadruple . . . pendular system, as described in my parent Patent No. 2,103,643, dated Dec. 28, 1937.

In the accompanying drawing, which shows by way of example, one form of device according to the invention:

Fig. 1 is a front-view of the counterweight of a crankshaft provided with devices for reducing torsional and flexional vibrations occurring in said shaft;

Fig. 2 is a corresponding sectional view of a rolling mass for reducing flexional oscillations; and, Fig. 3 is a sectional view of said mass along line 3—3 of Fig. 2.

Devices embodying the present invention may be arranged at any points of the shafts to be protected against irregularities of angular speeds or vibrations. Thus, for instance, a flywheel provided with such devices may, in an automobile motor, be placed in front of the motor, near the starting crankshaft or else near the clutch at the point where the shaft passes out of the motor or else in the middle of the motor. However, for an efficient elimination of the oscillations of the crankshaft, it is often of interest to dispose the different arrangements according to my invention near the points where the oscillations arise, i. e. near the head of each connecting rod.

The device shown in the drawing is located, by way of example, in the counterweight 11 of a crankshaft 1, the middle plane of said counterweight being perpendicular to the axis of rotation of the crankshaft.

Hollows 12 are provided in the counterweight, as far as possible from the axis of rotation of the crankshaft. In each of said hollows the side most distant from said axis of rotation is fitted with a member 13, the inner side of which has a cylindrical surface having its axis extending in the middle plane of the counterweight 11. A ball 6 is located in each hollow 12 so as to freely roll on the cylindrical race, perpendicularly to said plane, but it is prevented from laterally escaping by two plates 14 bolted onto opposite sides of the counterweight 11. I thus reduce flexional oscillations of the crankshaft.

I simultaneously reduce torsional oscillations of said shaft by means of two or several auxiliary masses 15 mounted on the same counterweight 11. In the form shown, each mass 15 is T-shaped and provided with a hollow 16, the inner side of which has a cylindrical surface 17. A pin 18 rigidly fixed to the counterweight 11 extends into hollow 16 so that the mass 15 may freely rock by the rolling motion of its surface 17 on pin 18. Said oscillatory motion is limited by any suitable means.

What I claim is:

1. In a crankshaft, a counterweight, an arcuate path provided in said counterweight and having a curvature in a plane containing the axis of rotation of the shaft, at least one mass located in said counterweight and urged against said path in use under centrifugal effect, and means for retaining said mass with respect to the counterweight against movement circumferentially of said axis while allowing it to swing along said path in a plane containing said axis under the action of the disturbing forces.

2. In a crankshaft, a counterweight, an arcuate path provided in said counterweight and having a curvature in a plane parallel to the axis of rotation of the shaft, at least one mass located in said counterweight and urged against said path in use under centrifugal effect, and means for movably retaining said mass with respect to the counterweight, said means preventing the mass from moving laterally of the shaft relative to said counterweight while allowing it to swing along said path longitudinally of said shaft under the action of the disturbing forces.

3. In a counterweight of the rotating crankshaft of a machine, a hollow, a race fitted in said hollow and having a cylindrical concave surface whose axis extends in a plane perpendicular to the axis of rotation of said crankshaft, a rolling mass in said hollow, adapted to roll on said race, when urged against it under the effect of the centrifugal force, in a direction substantially parallel to the axis of rotation of the crankshaft, and means for preventing said mass from laterally escaping out of the hollow.

4. In a counterweight of the rotating crankshaft of a machine, a hollow, a race fitted in said hollow and having a cylindrical concave surface whose axis extends in a plane perpendicular to the axis of rotation of said crankshaft, a rolling mass in said hollow, adapted to roll on said race, when urged against it under the effect of the centrifugal force, in a direction substantially parallel to the axis of rotation of the crankshaft, and two plates provided on either sides of the counterweight for preventing said mass from laterally escaping out of the hollow.

5. In a counterweight of the rotating crankshaft of a machine, a hollow, a race fitted in said hollow and having a cylindrical concave surface whose axis extends in a plane perpendicular to the axis of rotation of said crankshaft, a ball in said hollow, adapted to roll on said race, when urged against it under the effect of the centrifugal force, in a direction substantially parallel to the axis of rotation of the crankshaft, and means for preventing said ball from laterally escaping out of the hollow.

6. The combination with the rotating crankshaft of a machine of a counterweight thereon having a hollow, a race fitted into said hollow and having a surface curved in a plane containing the axis of rotation of said crankshaft, said surface being concave toward said axis, a rolling mass in said hollow adapted to be centrifugally held against said surface during rotation of the crankshaft and constrained to move along said surface in a plane containing said axis, and means for limiting said movement of the mass.

7. The combination with the rotating crankshaft of a machine of a counterweight thereon having a hollow with a surface curved in a plane containing the axis of rotation of said crankshaft, said surface being concave toward said axis, a freely moving mass in said hollow adapted to be centrifugally held against said surface during rotation of the shaft and constrained to move along said surface in a plane containing said axis, and means for limiting movement of the mass in the axial direction of the crankshaft.

8. In combination with a rotating shaft of a machine, a member mounted on said shaft for rotation therewith, said member having a plurality of circumferentially spaced hollows therein, each of said hollows having a surface which is curved in a plane containing the axis of rotation of said shaft and concave toward said axis, a rolling mass in each of said hollows adapted to be centrifugally held against said curved surface therein during rotation of the shaft and constrained to move along said surfaces in planes containing said axis, and means for limiting the movement of each of said masses in the axial direction of the shaft.

9. In combination with a rotating shaft, a member mounted on said shaft for rotation therewith and having a plurality of circularly arranged hollows therein, each of said hollows having a surface which is curved in a plane containing the axis of rotation of said shaft and concave toward said axis, freely moving masses in said hollows adapted to be centrifugally held against said curved surfaces during rotation of the shaft for movement along said surfaces in planes containing said axis, said hollows being formed so as to hold said masses against movement circumferentially of said shaft, and means for limiting the movement of said masses axially of the shaft.

10. The combination with the rotating crankshaft of a machine of a counterweight on said crankshaft and having a hollow with opposed parallel side walls formed by integral portions of the counterweight, a metallic insert secured to said counterweight, said insert having a surface between the planes of said walls which is concave toward the axis of rotation of said crankshaft, and a rolling mass in said hollow adapted to be centrifugally held against said surface during rotation of the crankshaft and constrained by said walls to move along said surface in a plane parallel to said walls.

11. The combination with a rotating crankshaft of a machine of a counterweight on said crankshaft and having a hollow with opposed parallel side walls formed by integral portions of the counterweight, a metallic insert secured to said counterweight, said insert having a curved surface between said walls which is concave toward the axis of rotation of said crankshaft, the axis of curvature of said surface being non-concentric with said axis of rotation, and a rolling mass in said hollow adapted to be centrifugally held against said surface during rotation of the crankshaft and constrained by said walls to move along said surface in a plane parallel to said walls.

FRANÇOIS MARIE MICHEL
BERNARD SALOMON.